United States Patent [19]

Ishikawa et al.

[11] Patent Number: 5,220,558
[45] Date of Patent: Jun. 15, 1993

[54] DROP/INSERT MULTIPLEXER FOR DATA CHANNEL ACCESS UNITS

[75] Inventors: Minoru Ishikawa, Tochigi; Nobuki Nakata, Kawasaki, both of Japan

[73] Assignee: Fujitsu Limited, Kawasaki, Japan

[21] Appl. No.: 429,478

[22] Filed: Oct. 31, 1989

[30] Foreign Application Priority Data

Oct. 31, 1988 [JP] Japan .................. 63-275296

[51] Int. Cl.⁵ ...................... H04J 1/10; H04J 3/08
[52] U.S. Cl. ...................... 370/55; 370/58.1; 370/58.2; 370/58.3; 370/100.1
[58] Field of Search ............ 370/55, 100.1, 58.1, 370/58.2, 58.3, 1, 69.1; 359/117, 139

[56] References Cited

U.S. PATENT DOCUMENTS

| | | | |
|---|---|---|---|
| 4,434,485 | 2/1984 | Huffman et al. | 370/55 |
| 4,468,767 | 8/1984 | Warren et al. | 370/55 |
| 4,989,199 | 1/1991 | Rzeszewski | 370/1 |

*Primary Examiner*—Douglas W. Olms
*Assistant Examiner*—Shick Hom
*Attorney, Agent, or Firm*—Staas & Halsey

[57] ABSTRACT

An improved drop/insert multiplexer for use in a channel access unit that uses common channel slots for data channels in first and second directions, and uses less wiring between a multiplexer/de-multiplexer section and a channel section. The drop/insert multiplexer has at the receive side thereof, a time slot phase difference setting stage for providing a predetermined phase difference between received timing signals as well as receive data from the first and second directions; a receive channel pulse generating stage generates multiplexed channels pulses; a receive channel pulse decoding stage and a PCM decoder reproduces a voice signal by receiving selected received data. At the send side thereof, a time slot phase difference correcting stage corrects the set phase difference for sending out channel data to the first and second directions; a send channel pulse generating stage generates multiplexed channel pulses; a send channel pulse decoding stage and a PCM coder produces PCM signals to send out to the first and second directions as channel data.

23 Claims, 6 Drawing Sheets

FIG. 1
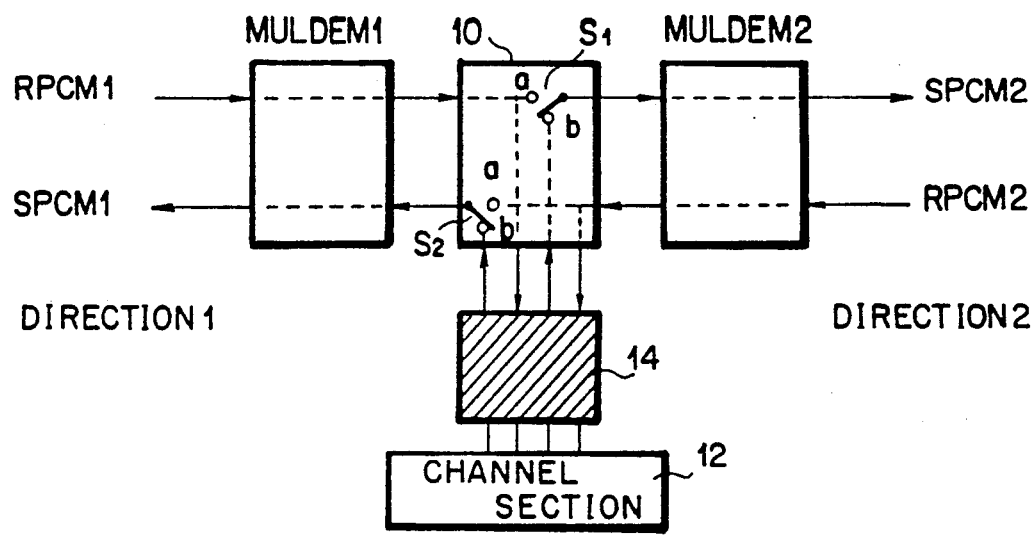
FIG. 2a
PRIOR ART
FIG. 2b
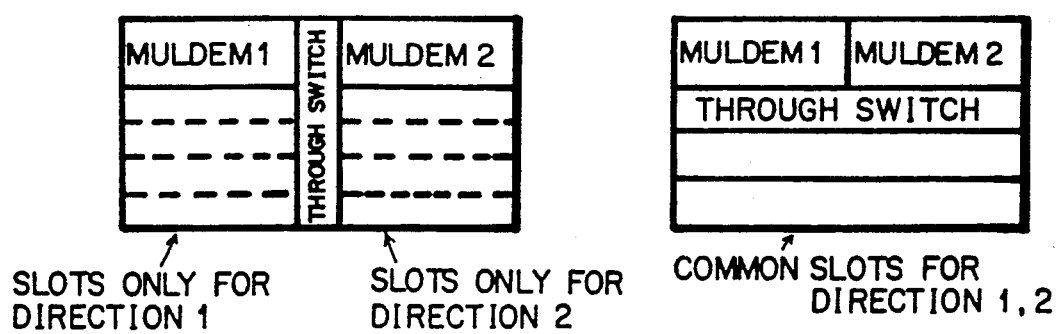

DROP/INSERT MULTIPLEXER FOR DATA CHANNEL ACCESS UNITS

BACKGROUND OF THE INVENTION

The present invention relates to a data channel access unit and, more particularly, to a drop/insert multiplexer of the type capable of receiving PCM signals from two directions and connecting a channel from either direction with own channel or connecting some channels of PCM signals from one direction with certain channels of PCM signals for the other direction.

A fundamental drop/insert MUX (multiplexer) is functionally shown in FIG. 1, wherein RPCM 1 and SPCM 1 denote a receive PCM signal and a send PCM signal in one direction (direction 1), similarly, SPCM 2 and RPCM 2 denote a send PCM signal and a receive PCM signal in the other direction (direction 2) and MULDEM 1, 2 denote a respective multiplexer/demultiplexer for each direction. Numeral 10 denotes a through switch unit and is brought into a "through" condition by turning switches S1 and S2 to "a" side for connecting the RPCM 1 to the SPCM 2 and the RPCM 2 to the SPCM 1 reciprocally, thereby permitting a communication between stations (not shown) installed in the direction 1 and in the direction 2 whilst brought into a "drop/insert" condition by turning the switches S1 and S2 to "b" side for dropping the RPCM 1, 2 into the channel section 12 and inserting the SPCM 1, 2 therefrom, thereby permitting a communication between stations installed at the channel section 12 side and in either direction 1 or 2. It is, therefore, a desirable feature for this type of multiplexer to accommodate any channel in the channel section 12 to operate in the direction 1 or the direction 2 with no restrictions. Block 14 is provided by the present invention to solve these and other problems.

In FIG. 3, there is shown a block diagram of the prior art drop/insert multiplexer, wherein four data lines of R (receive) data 1, R data 2, S (send) data 1, and S data 2 have associated exclusively with four sets of channel pulse [9] for R side in the direction 1, channel pulse [1Q] for R side in the direction 2, channel pulse [11] for S side in the direction 1 and channel pulse [12] for S side in the direction 2.

As seen in the foregoing, in accordance with the prior art, wirings between the MULDEM side and the channel (CH) side are increased in number and there have been caused such problems as lack of flexibility in wiring and, in some occasions, surplus of channel slots due to channel installation spaces provided exclusively for each direction 1 and 2 as it is shown in FIG. 2(a).

In the PCM-30 system, for example, in case of setting 1 CH for the direction 1, 10 CH for the direction 2 and 19 CH for through channels between the direction 1 and 2, there may cause many unused surplus channel slots for the direction 1. More specifically, if full channel slots are provided for the both directions by assigning one slot for one channel, as it is seen in FIG. 2a, there need 30 by 2 slots and 29 slots for the direction 1 will be left unused (20 slots will be left unused for the direction 2). In practice, for making use of the space efficiently, it is common to adopt such an arrangement that one slot is assigned for one sheet and several channels are provided thereon, a number of slots is limited to small instead, of providing full slots, or the like. However, if slots for the directions 1 and 2 are the same in number, for example, and there needed are 29 CH for the direction 1 and 1 CH for the through operation, it will also be of necessity to provide 29 CH for the direction 2 and resulting in a problem of flexibility.

It is, therefore, a principle object of the invention to solve the aforesaid problems and to eliminate the difficulties to be encountered in the installation for providing a drop/insert multiplexer for channel access units having flexibility in the installation of channel slots.

It is another object of the invention to provide a drop/insert multiplexer for channel access units having simple wiring by employing a multiplex channel pulse transmission system.

SUMMARY OF THE INVENTION

Accordingly, the present invention can eliminate the problems encountered in the prior art for providing a flexible and rational drop/insert multiplexer for channel access units and relates mainly to a hatched block 14 interposed between the through switch unit 10 and the channel section 12 in FIG. 1.

In accordance with the present invention, there provided is a drop/insert multiplexer for channel access units which can afford to drop and insert channel data for PCM signals in the directions 1 and 2, see FIG. 4, comprising a time slot phase difference setting unit for providing a predetermined phase difference between received timing signals as well as received data from the directions 1 and 2, a receive channel pulse generating unit for generating multiplexed channel pulses upon receipt of the timing signals provided with the predetermined phase difference, a receive channel pulse decoding unit for generating synchronous pulses to operate a PCM decoder after decoding the received multiplexed channel pulses, a received data selecting unit for supplying received data to the PCM decoder by selecting the received data having the predetermined phase difference, a time slot phase difference correcting unit for setting a predetermined phase difference between send side timing signals in the directions 1 and 2 and for correcting a phase difference between sending data for both directions in accordance with the predetermined phase difference, a send channel pulse generating unit for generating multiplexed channel pulses upon receipt of the send side timing signals provided with the predetermined phase difference, a send channel pulse decoding unit for generating synchronous pulses to operate PCM coder after decoding the multiplexed channel pulses, and a send data selecting unit for selecting sending data produced at the PCM coder in accordance with the multiplexed timing signals to direct to the either direction 1 or 2 and feeding the selected sending data to the phase difference correcting unit, wherein channel pulses for the directions 1 and 2 are multiplexed in transmission between the receive channel pulse generating unit and the receive channel pulse decoding unit as well as the send channel pulse generating unit and the send channel pulse coding unit.

According to an embodiment of the invention, the channel pulses (RCH 1-5, SCH 1-5) are transmitted in a time division multiplexing basing on the directions 1 and 2, so that the wirings between the MULDEM section and the CH section are kept small, moreover, the channel slots for the directions 1 and 2 are allowed to be used in common, there provided are a great flexibility in the assignment of channel slots for either direction regardless of numbers in use and a great benefit in the installation thereof.

BRIEF DESCRIPTION OF THE DRAWINGS

FIG. 1 is a block diagram illustrating a fundamental drop/insert multiplexer;

FIG. 2a and 2b are diagrams illustrating exclusive use type channel slots and common use type channel slots in the installations;

DESCRIPTION OF THE PREFERRED EMBODIMENTS

Figure 3:
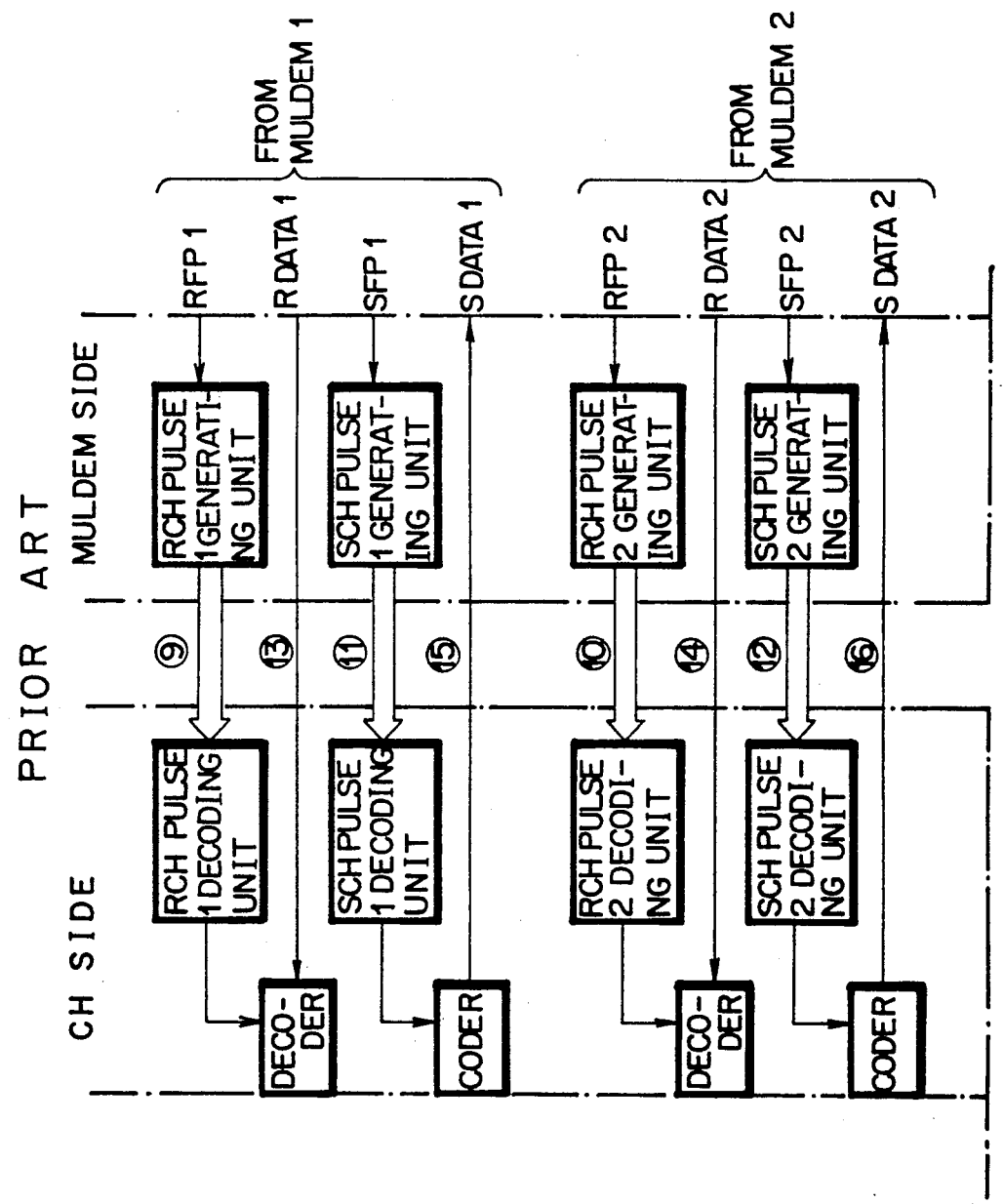
FIG. 3 is a block diagram illustrating the prior art drop/insert multiplexer.
Figure 4:
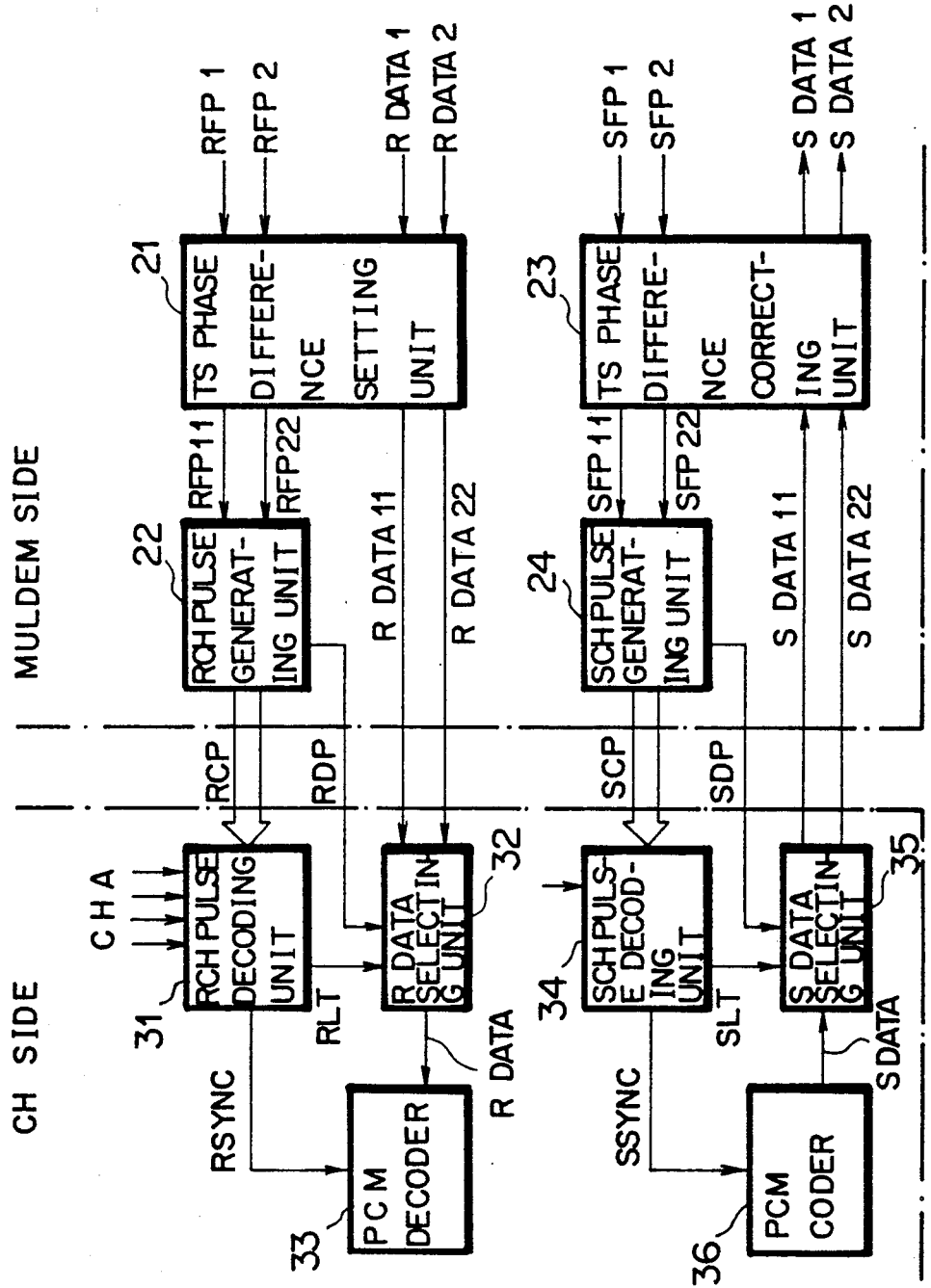
FIG. 4 is a block diagram illustrating an embodiment of the invention.

A preferred embodiment of the invention will now be described more in detail with reference to the accompanying drawings, in the several figures of which like reference numerals identify like elements. Referring to FIG. 4, there is shown an embodiment of this invention. As seen, a channel access signal for MULDEM 1 and a channel access signal for MULDEM 2 are combined or multiplexed, whereby numerals 1, 2 such as for RFP (Receive Frame Pulse) 1, RFP 2 designate the numbers of MULDEM to be interfaced. It should be noted that the RFP is a timing pulse to specify a specific time position in a received frame such as a leading edge thereof, in like way, SFP (Send Frame Pulse) identifies a like time position in a sending frame.

There provided in the MULDEM side are a time slot (TS) phase difference setting unit 21 and a receive channel (RCH) pulse generating unit 22 for receiving PCM signals, and a TS phase difference correcting unit 23 and a send channel (SCH) pulse generating unit 24 for sending out PCM signals. Correspondingly, there provided in the CH side are a RCH pulse decoding unit 31, an R data 11, 22 selecting unit 32 and a PCM decoder 33 for the reception of input data, and a SCH pulse decoding unit 34, a S data 11, 12 selecting unit 35 and a PCM coder 36 for the transmission of output data.

At the phase difference setting unit 21 in the MULDEM receiving area, a phase difference between frames or time slots of R data 1 and R data 2 is detected upon receipt of the timing signals RFP 1, 2 and there provided is a phase difference (time difference) such as of about ½ time slot between the R data 1 and the R data 2 based on the detected phase difference. The R data 1 and the R data 2 provided with the phase difference are called R data 11 and R data 22 herein after. Accordingly, new timing signals RFP 11, RFP 22 provided with said phase difference are derived from the TS phase difference setting unit 21.

These timing signals are fed to the RCH pulse generating unit 22 and there generated are a multiplexed channel pulse RCP and a receive direction pulse RDP which indicates the direction whether it is from 1 or 2.

In the CH receiving area, the multiplexed channel pulse RCP is decoded at the RCH pulse decoding unit 31 in accordance with a back board channel address CHA and there generated are a received synchronizing signal RSYNC and a timing signal RLT (Received Latch Timing signal) for taking in the RDP for the associated CH to the R data selecting unit 32. At the R data selecting unit 32, either of R data 11 or R data 22 is selected by using the RLT and the RDP signals and, then, a selected data signal is fed to the PCM decoder as R data. This R data are, in turn, decoded at the decoder 33 by using the RSYNC for reproducing an audio signal.

In the MULDEM and CH sending areas, the SCH pulse generating unit 24 and the SCH decoding unit 34 are operated in a similar manner to that of the RCH pulse generating unit 22 and the RCH pulse decoding unit 31 in the MULDEM and CH receiving areas and there provided are a multiplex CH pulse SCP, a send direction pulse SDP for indicating either direction 1 or 2, a timing signal SLT for taking in the SDP to the S data selecting unit 35 and a send synchronizing signal SSYNC respectively. At the S data selecting unit 35, S data produced at the PCM coder 36 are selected by using the SDP and SLT signals for supplying S data 11 or S data 22 therefrom. At the TS phase difference correcting unit 23, the S data 11 and the S data 22 having the phase difference which has been given to the timing signals SFP 1 and SFP 2 are brought back to the original phase difference by giving the reciprocal phase correction thereto for supplying the sending data as S data 1 and S data 2 with the proper phase difference to the appropriate MULDEM 1, MULDEM 2 in the directions 1, 2.

In accordance with the embodiment of the invention as described above, it is obvious from the drawing shown in FIG. 4, there are no differences in the components to be used for the traffics in the direction 1 and the direction 2 at the CH side and they are, in fact, arranged in one unit. Therefore, the separated slots for the direction 1 and the direction 2 shown in FIG. 2a are now combined for the common use in both directions 1 and 2 as it is shown in FIG. 2b and the number of slots can be decreased considerably. In accordance with the PCM-30 system, for an example, if one slot is assigned for one channel, there need 60 slots by the arrangement shown in FIG. 2a while only 30 slots by the arrangement shown in FIG. 2b. Furthermore, vacant slots will not cause any problem in the installation even if a number of slots to be used in the direction 1 differs from that of the direction 2 and, moreover, a number of signal lines can be decreased by half because of the multiplex transmission of channel pulses in the both directions 1 and 2 between the RCH/SCH pulse generating units 22/24 at the MULDEM side and the RCH/SCH pulse decoding units 31/34 at the CH side.

Figure 5:
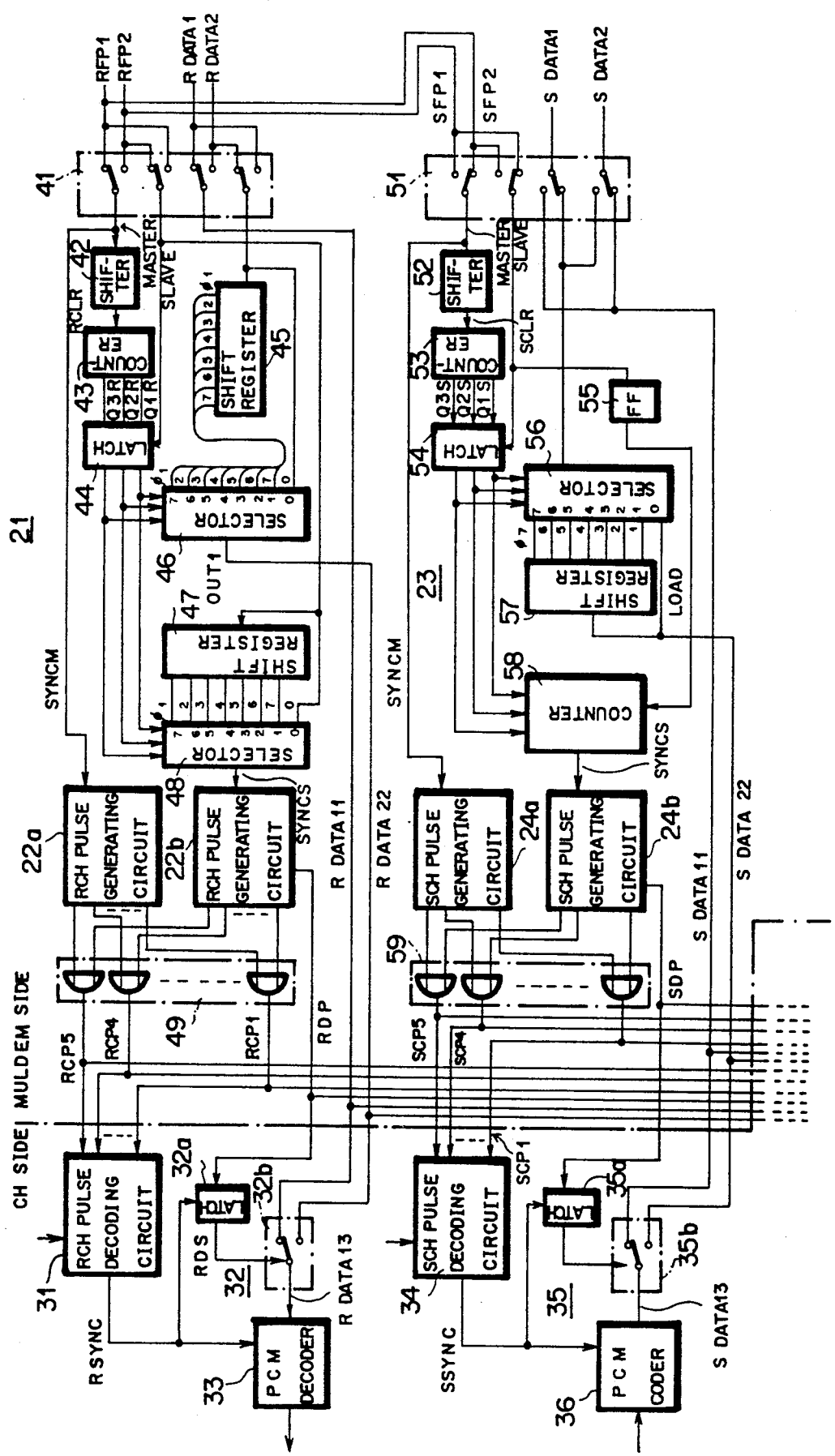
FIG. 5 is a circuit diagram partly in block form showing another embodiment of this invention.

An effective and preferred circuit embodying the present invention in accordance with the PCM-30 system is shown in FIG. 5. The operation of the circuit may best be understood by reference to the following description taken in connection with the accompanying drawings, in the several figures of which like reference numerals and abbreviations identify like elements. Time charts for the receiving areas and the sending areas of the circuit shown in FIG. 5 are illustrated in FIG. 6 and FIG. 7 respectively.

As illustrated in FIG. 5, timing signals RFP 1, RFP 2 (period is 125 μs) are fed to a M/S (master/slave) selecting switch 41 for the selection and the selected timing signal is fed to a 4 bit-shifter 42 as a master timing signal. In the embodiment shown in FIG. 5, the RFP 1 is selected as the master timing signal and the RFP 2 is selected as a slave timing signal. The RFP 1 is shifted by 4 bits at the shifter 42 (clock signal is not shown in FIG. 5) and the 4 bit shifted timing signal (RCLR=Clear/R side) is fed to an octal counter 43 for resetting. The octal counter 43 then derives divided outputs of Q1R, Q2R and Q3R from the R side clock signal by dividing it ½, ¼ and ⅛. In this embodiment of the invention, 8 bits are assigned for one time slot hence the 4 bits in the shifter 42 indicate a ½ time slot.

A latch circuit 44 is provided for detecting a phase difference between the shifted timing signal RCLR and the slave timing signal RFP 2, whereby the phase difference is detected by latching the octal counter outputs Q1R-Q3R with the slave timing signal RFP 2. Now referring to FIG. 6, there is shown a time difference between the master timing signal RFP1 and the slave timing signal RFP 2 by 14 clock pulses. Therefore, a time difference between the shifted timing signal RCLR (attained by shifting the master timing signal RFP 1 by 4 bits) and the slave timing signal RFP 2 equals to 10 clock pulses. The outputs of Q1R, Q2R and Q3R at the time of trailing edge of a pulse in the slave timing signal RFP 2 are 0, 1, 0 and indicating 10−8=2. The latch circuit 44, then, indicates the phase difference with $8 \times n + 2$ (where n=0, 1, 2, 3, . . . ) by receiving the outputs 0, 1, 0 of the counter. It is apparent from the foregoing that the phase difference between the shifted timing signal RCLR and the slave timing signal RFP 2 equals to 2 bits in a scale of time slot since one time slot has 8 bits. Numerals 45, 47 designate 7 bit shift registers and generate 7 different phase signals $\phi 1$-$\phi 7$ respectively by shifting the R data 2 and the slave timing signal RFP 2 which are selected to be the slave by the switch 41. A basis of 7 bits consists in the point to provide phase synchronization in the time slot level between the R data 1 and the R data 2. Numerals 46, 48 are selectors having 8 inputs in each for selecting one signal amongst 8 different phase signals which are provided by the 7 different phase signals derived from the shift registers 45, 47 and signals with no delay being fed directly from the switch 41 and deliver outputs of OUT 1 and SYNCS respectively. With this arrangement, the slave timing signal RFP 2 and the R data 2 at the slave side can be delayed exactly by 4 bits in time slot level from the master timing signal RFP 1 and the R data 1 at the master side.

Figure 6:
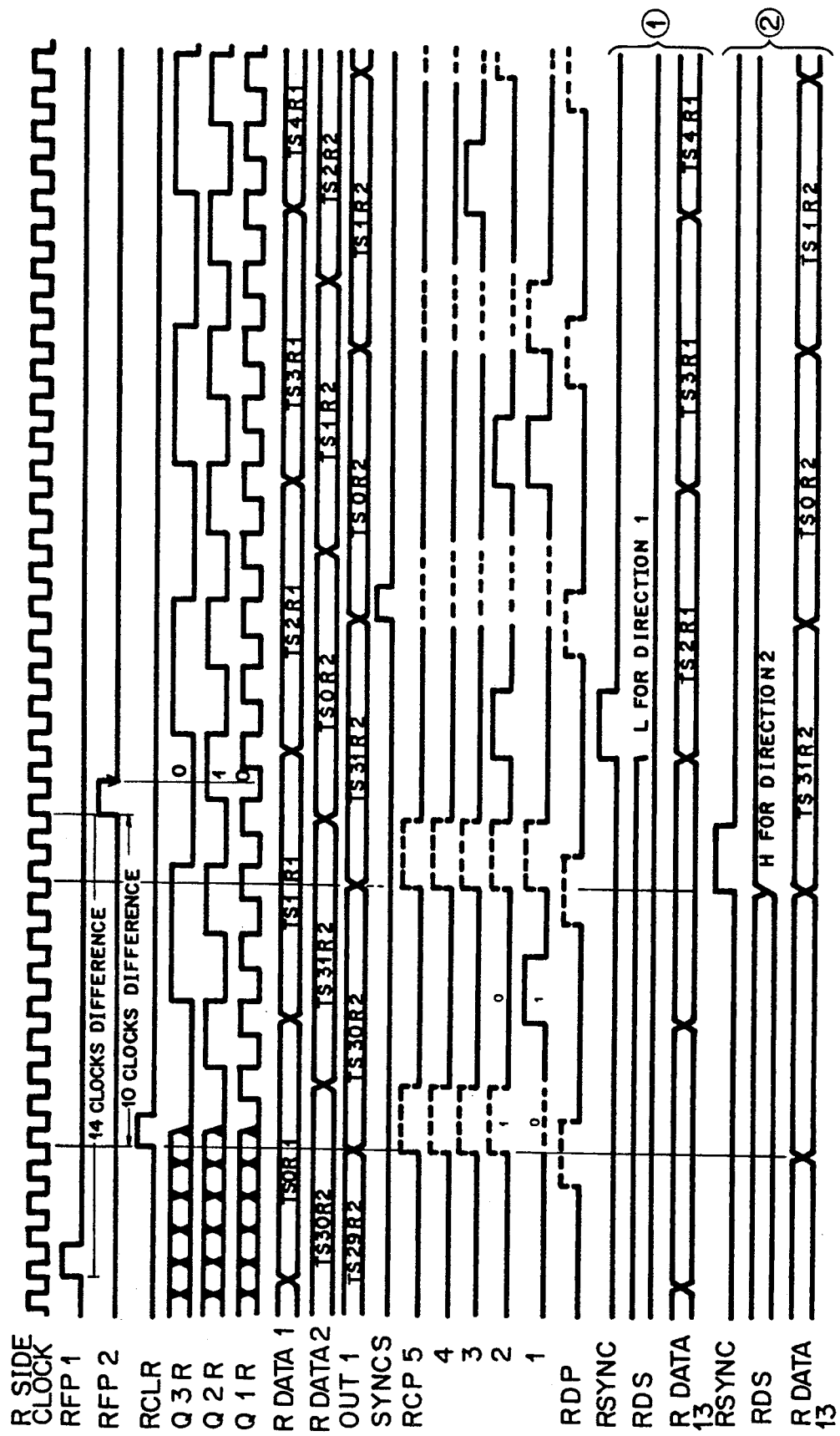
FIG. 6 is a time chart illustrating the operation at the receiving side of the embodiment shown in FIG. 5.
Figure 7:
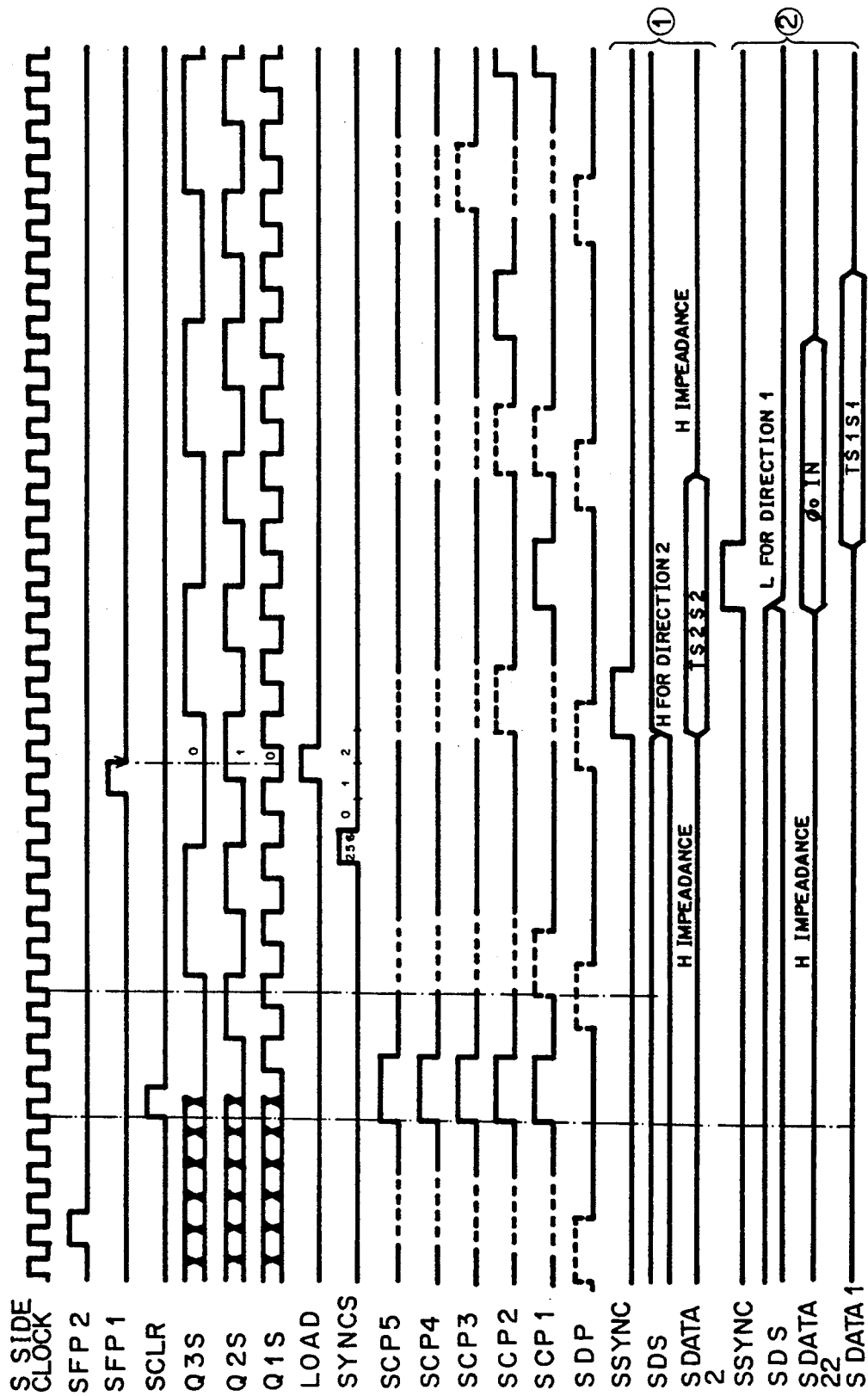
FIG. 7 is a time chart illustrating the operation at the sending side of the embodiment shown in FIG. 5.

There are 14 clock pulses in difference between the mater and slave timing signals RFP 1 and RFP 2 as it is seen in FIG. 6, however, since the one time slot equals to 8 bits in length, the 14 clock pulses can be treated as 14−8=6 bits difference and by operating the selectors 46 and 48 to select on a base of the output 0, 1, 0 or 2 of the latch circuit 44, whereby an input $\phi 6$ fed to each input terminal 2 is selected respectively to be an output thereof, the phase difference between the master side signals and the slave side signals can be set to 4 bits. In other words, the slave timing signal RFP 2 is delayed from the master timing signal RFP 1 by an amount of 14+6=20 bits and this in turn equals to 20−8×2=4, thus resulting in 4 bits delay or difference.

These circuit elements 41-48 constitute the TS phase setting stage 21 shown in FIG. 4. As seen in the drawings of FIG. 4 and FIG. 5, the output R data 11 of the TS phase setting stage 21 is the R data 1 itself derived directly from the switch 41 and the output R data 22 is the output 1 of the selector 46 while the timing output RFP 11 (SYNCM=Master Synchronous Signal) is the timing signal RFP 1 itself derived from the switch 41 and the timing output RFP 22 is the output SYNCS (Slave Synchronous Signal) of the selector 48. The SYNCS is delayed from the SYNCM by an amount of (8n+4) bits (where n=1, 2, 3, . . . ). In FIG. 6, TS0R1, TS1R1, . . . denotes R data 1 in time slot 0, R data 1 in time slot 1, . . . respectively and, in like manner, TS30R2, TS31R2, . . . denotes R data 2 in time slot 30, R data 2 in time slot 31, . . . respectively. The number of time slots for one frame is 32.

Two RCH pulse generator circuits of 22a and 22b are provided at the MULDEM side and generate pulses RCH 1-RCH 5 respectively based on a timing specified by the SYNCM and SYNCS signals. The generated pulses RCH 1-RCH 5 are then multiplexed into receive channel pulses RCP 1-RCP 5 and transmitted to the CH side for generating RSYNC (Receive Synchronous Pulse) which is used in the PCM decoder 33 for decoding. The RCH pulse generator 22b further generates RDP (Receive Direction Pulse) to identify that the RCH 1-RCH 5 generated by itself belong to the slave side. Since the channel pulses RCH 1-RCH 5 generated by the RCH pulse generators 22a and 22b have 4 bits phase difference each other, they can easily multiplexed for transmission. A group of OR gates 49 are provided for multiplexing (logical sum) these channel pulses RCH 1-RCH 5 and then the signal lines for transmitting the multiplexed timing pulses RCP 1-RCP 5 from the MULDEM side to the CH side are decreased substantially by half.

In the timing chart shown in FIG. 6, dotted lines for the RCP 1-RCP 5 indicate the slave side (direction 2) pulses while solid lines indicate the master side (direction 1) pulses. According to the timing chart, the receive direction pulses RDP are advanced in timing than the receive channel pulses RCP, however, it may be set to the same timing.

The receive channel pulses RCP 1-RCP 5 are decoded at the RCH pulse decoding circuit 31 in accordance with the back board CH (channel) address and the RSYNC pulses are derived therefrom. Channel pulses that correspond to the associated channels are derived from the RCH decoding circuit 31 as the RSYNC pulses. The slave side identifying pulses or receive direction pulses RDP are latched at a latch circuit 32a with a timing of the RSYNC pulses and there derived is a receive side direction signal RDS of 1 or 0 depending on the existence or non existence of the RDP pulses for switching a switch 32b. With this arrangement, the R data 11 is fed to the PCM decoder 33 when the switch 32b is switched to the master side whilst the R data 22 is fed to the PCM decoder 33 when the switch 32b is switched to the slave side. One of the alternating R data 11 and R data 22 is decoded at the PCM decoder 33 upon receipt of the selected RSYNC for the corresponding CH and a decoded signal such as a voice signal is fed to succeeding channel units as an output thereof. In FIG. 6, (1) is a timing diagram showing waveforms of the RSYNC, RDS and R data for decoding TS2R1 data in the direction 1 and (2) is a timing diagram showing waveforms of the RSYNC, RDS and R data for decoding TS31R2 data in the direction 2.

The TS phase difference correcting stage 23 in the sending area shown in FIG. 4 is consisted of a selecting switch 51, a 4 bit shifter 52, an octal counter 53, a latch circuit 54, a 7 bit shift register 57, a selector 56 and a 256 bit counter with load in the embodiment of this invention shown in FIG. 5. The timing pulses RFP 1, RFP 2 in the receiving area are substituted for timing pulses SFP (Sending Frame Pulse) 1, SFP 2 in the sending area. The selecting switch 51 is a switch for selecting master/slave designation in a similar manner to the selecting switch 41 in the receiving area. In the embodiment of this invention shown in FIG. 5, the timing pulse SFP 2 which is the same as the RFP 1 is selected as a master timing signal and the timing pulse SFP 1 which is the same as the RFP 2 is selected as a slave timing signal. The SFP 2 selected to be the master timing signal at the selecting switch 51 is fed to the 4 bit shifter 52 and the SFP 1 selected to be the slave timing signal is fed to the latch circuit 54 as a trigger signal to latch. A phase difference between these timing signals SFP 2 and SFP 1 is detected by the elements 52-54. The operation of detecting the phase difference is all the same as that of the receiving side. Accordingly, it is assumed that 0 1 0 or 2 is latched, as it is shown in FIG. 7, at the latch circuit 54 in the sending area as well in the embodiment of this invention. Since the elements 52-54 are the same in operation as the elements 42-44, the elements 42-44 may be used in common, however, if the master and the slave are in reverse, there needed are the elements 42-54.

The timing signal SFP 2 which is selected to be the master timing signal is fed to a SCH pulse generator 24a as a master side synchronizing pulse SYNCM. A phase difference at the latching circuit 54 latched by the slave side SFP 1 is fed to the 256 bit (8 bits×32 or 1 frame) counter 58 as an initial value and a slave side synchronizing pulse SYNCS is derived therefrom as a carry by starting clock counting with the initial value. In accordance with the above described operation, there provided is a phase difference of (8n+4) bits between the synchronizing pulses SYNCS and SYNCM. These synchronizing pulses SYNCS and SYNCM are then fed to the SCH pulse generators 24a and 24b for generating send channel pulses SCH 1-SCH 5 respectively. The send channel pulses SCH 1-SCH 5 generated by the SCH pulse generators 24a and 24b have 4 bits phase difference between each other, therefore, it is easy to multiplex them for the transmission from the MULDEM side to the CH side. A group of OR gates 59 is used for multiplexing the send channel pulses SCH 1-SCH 5 and a number of signal lines for transmitting the multiplexed timing pulses or send channel pulses SCP 1-SCP 5 from the MULDEM side to the CH side can be decreased by half.

The send channel pulses SCP 1-SCP 5 are decoded at the SCH pulse decoding circuit 34 in accordance with the back board address and a sending synchronous signal SSYNC is derived therefrom. The master/slave identifying pulses or send direction pulses SDP are latched at a latch circuit 35a with an input timing of the SSYNC for switching a switch 35b. Input signals such as voice signals from CH side units are converted into PCM signals at the PCM coder 36 and the coded signals (S data 13) are transmitted to the MULDEM side by altering them to S data 11 for master data or S data 22 for slave data in accordance with the master/slave mode selected by the switch 35b. At the MULDEM side, the S data 22 are fed simultaneously to the selector 56 and the shift register 57 and thereby corrected in phase basing on the latched phase difference fed by the latch 54, more specifically, an input φ2 signal being fed to an input terminal 2 of the selector 56 is selected as an output therefrom in accordance with the latched value of 2 at the latch 54. That is, since the slave side S data 22 are synchronized with the output pulses of the SCH pulse generator 24b, the S data 22 is advanced in phase as compared with the original slave side send frame pulses SFP by an amount of the setting (2 bits for this embodiment) at the counter 58. Therefore, by giving the delay, which is the same amount of time duration advanced in the setting, to the S data 22 at the shift register 57 and the selector 56, the S data 22 can be recovered to the original timing base. The outputs of the selector 56 or the phase corrected S data 22 are sent out as the S data 1 by means of the selecting switch 51, similarly, the phase corrected S data 11 are sent out as the S data 2. In FIG. 7, (1) is a timing diagram showing wave forms of the SSYNC, SDS and S data for inserting the S data 2 into TS2S2 in the direction 2 and (2) is a timing diagram showing waveforms of the SSYNC, SDS and S data for inserting the S data 1 into TS1S1 in the direction 1.

Although the present invention has been described in detail with reference to the preferred embodiment, it should be understood by those skilled in the art that various changes may be made and equivalents may be substituted for elements thereof without departing from the scope of the invention. Therefore, it is intended that the invention is not be limited to the particular embodiment disclosed as the best mode contemplated for carrying out this invention, but the invention will include all embodiments falling within the scope of the appended claims.

What is claimed is:

1. A drop/insert multiplexer for a channel access unit to provide drop/insert of channel data in modulated signals from/to both first and second directions, comprising:

first means for receiving and sending out, on inputs and outputs, channel data in the modulated signals and receiving timing signals in the modulated signals from/to both the first and second directions;

second means, operatively connected to said first means, for generating multiplexed channel pulses in accordance with a phase difference between the timing signals of the channel data received in the modulated signals from both the first and second directions;

connection means, operatively connected to said second means, for transmitting over paths the multiplexed channel pulses and associated data; and third means, operatively connected to said second means via said connection means, for decoding the multiplexed channel pulses to select the associated data from/to both the first and second directions.

2. A drop/insert multiplexer as defined in claim 1, wherein said second means includes receiving means for receiving the modulated signals from the first means, and transmitting means for sending out the modulated signals to said first means in either of the first or second directions, and wherein said third means includes decoding means for decoding channel data in the modulated signals, and coding means for coding input data to provide the modulated signals sent out by said transmitting means.

3. A drop/insert multiplexer as defined in claim 2, wherein said receiving means includes a time slot phase difference setting unit operatively connected to said first means, and a receive channel pulse generating unit operatively connected to said time slot phase difference setting unit and said decoding means via said connection means, and wherein said transmitting means includes a time slot phase difference correcting unit operatively connected to said first means, and a send channel pulse generating unit operatively connected to said time slot phase difference correcting unit and said coding means via said connection means.

4. A drop/insert multiplexer as defined in claim 2, wherein said decoding means includes:
- a receive channel pulse decoding unit operatively connected to said receiving means via said connecting means,
- a received data selecting unit operatively connected to said receive channel pulse decoding unit and said receiving means via said connection means, and
- a PCM decoder operatively connected to said receive channel pulse decoding unit and said received data selecting unit, and wherein said coding means includes:
- a send channel pulse decoding unit operatively connected to said transmitting means via said connection means,
- a sending data selecting unit operatively connected to said send channel pulse decoding unit and said transmitting means via said connection means, and
- a PCM coder operatively connected to said send channel pulse decoding unit and said sending data selecting unit.

5. A drop/insert multiplexer as defined in claim 3, wherein said time slot phase difference setting unit generates receive frame pulses and associated receive data in accordance with a phase difference between the timing signals of channel data from both the first and second directions,
wherein said receive channel pulse generating unit generates multiplexed receive channel pulses upon receipt of the receive frame pulses from said time slot phase difference setting unit,
wherein said time slot phase difference correcting unit generates send frame pulses and send channel data in accordance with a phase difference between the timing signals from said first means, and
wherein said send channel pulse generating unit generates multiplexed send channel pulses upon receipt of the send frame pulses from said coding means via said connection means.

6. A drop/insert multiplexer as defined in claim 4, wherein said receive channel pulse decoding unit derives received synchronizing pulses by decoding the multiplexed receive channel pulses,
wherein said received data selecting unit selectively feeds associated receive data to said PCM decoder from said receiving means via said connection means based on said receive synchronizing pulses,
said send channel pulse decoding unit derives send synchronizing pulses by decoding the multiplexed send channel pulses, and
wherein said sending data selecting unit selectively feeds associated send data from said PCM coder to said transmitting means via said connection means based on said send synchronizing pulses.

7. A drop/insert multiplexer as defined in claim 3, wherein said time slot phase difference setting unit includes a first master/slave selecting switch operatively connected to said first means for selecting receive channel data from one of the first and second directions, and
wherein said time slot phase difference correcting unit includes a second master/slave selecting switch operatively connected to said first means for selecting send channel data for one of the first and second directions.

8. A drop/insert multiplexer as defined in claim 3, wherein said receive channel pulse generating unit includes master and slave receive channel pulse generating circuits operatively connected to said first means for respectively generating master and slave receive channel pulses, and a receive multiplexer operatively connected to said master and slave receive channel pulse generating circuits for multiplexing the master and slave receive channel pulses,
wherein said send channel pulse generating unit includes master and slave send channel pulse generating circuits operatively connected to said first means for respectively generating master and slave send channel pulses, and a transmit multiplexer operatively connected to said master and slave send channel pulse generating circuits for multiplexing the master and slave send channel pulses.

9. A drop/insert multiplexer as defined in claim 4, wherein said received data selecting unit includes a first latch circuit operatively connected to said receive channel pulse decoding unit and said receiving means via said connection means and a received data selecting switch, operatively connected to said first latch circuit, said PCM decoder and said receiving means via said connection means, for selecting a data signal on a channel of associated receive data to feed to said PCM decoder, and
wherein said sending data selecting unit includes a second latch circuit operatively connected to said send channel pulse decoding unit and said transmitting means via said connection means and a sending data selecting switch, operatively connected to said second latch circuit, said PCM coder and said transmitting means via said connection means, for selectively sending a data signal on a channel of associated send data from said PCM coder to feed to said transmitting means.

10. A drop/insert multiplexer as defined in claim 1, wherein the paths in said connection means are timing signal lines for sending the multiplexed channel pulses and data lines for sending the associated data.

11. A drop/insert multiplexer as defined in claim 3, wherein said time slot phase difference setting unit includes:
- a first shifter operatively connected to said first means to receive timing signals,
- a first counter operatively connected to said first shifter,
- a first latch circuit operatively connected to said first counter
- a first shift register, operatively connected to said first means, to receive channel data,
- a first selector, operatively connected to said first shift register and said latch circuit, to select an output of said first shift register in response to said latch circuit providing associated receive data to said third means via said connection means,
- a second shift register operatively connected to said first means to receive timing signals, and
- a second selector, operatively connected to said second shift register and said latch circuit, to select an output of said second shift register in response to said latch circuit providing the associated receive data to said third means via said connection means, and wherein the time slot phase difference correcting unit includes:
  a second shifter, operatively connected to said first means to receive timing signals,
  a second counter operatively connected to said second shifter,
  a latch circuit operatively connected to said second counter,
  a one frame bit counter operatively connected to said first latch circuit,
  a third shift register, operatively connected to said third means via said connection means, to receive associated send data and produce an output, and
  a third selector, operatively connected to said third shift register and said third latch circuit, to select the output of said third shift register in response to said third latch circuit providing send channel data to said first means.

12. A drop/insert multiplexer as defined in claim 8, wherein said slave receive channel pulse generating circuit generates and provides received direction pulses to said decoding means to identify the associated data which is received, and
wherein said slave send channel pulse generating circuit generates and provides sending direction pulses to said coding means to identify the associated data which is sent.

13. A drop/insert multiplexer as defined in claim 8, wherein said receive multiplexer and said transmit multiplexer include a plurality of OR gates, each operatively connected to one of said master and slave receive channel pulse generating circuits and said master and slave send channel pulse generating circuits.

14. A drop/insert multiplexer apparatus to provide drop/insert of channel data in modulated signals, said apparatus comprising:
  first means functioning as multiplexer/demultiplexers for receiving and sending modulated signals including timing signals and channel data;
  second means for receiving timing signals and channel data from said first means and for generating multiplexed receive channel pulses and associated receive data in accordance with a phase difference between the timing signals of the modulated signals received from the first means; and
  third means for selecting a data signal from the associated data and for decoding the data signal.

15. An apparatus according to claim 14, wherein said second means includes:
  a time slot phase difference setting unit operatively connected to said first means;
  a received channel pulse generating unit operatively connected to said time slot phase difference setting unit, said first means, and said decoding means.

16. An apparatus according to claim 14, wherein said third means includes decoding means for selecting the data signal from the associated receive data based on the multiplexed channel pulses from said second means before decoding the data signal.

17. An apparatus according to claim 16, wherein said decoding means includes:
  a receive channel pulse decoding unit, operatively connected to said receiving means, deriving received synchronizing pulses by decoding the multiplexed received channel pulses;
  a PCM decoder connected to said received channel pulse decoding unit; and
  a received data selecting unit, operatively connected to said received channel pulse decoding unit and said receiving means, selecting based on the received synchronizing pulses, a data signal on a channel of the associated receive data from said receiving means for decoding by said PCM decoder.

18. An apparatus according to claim 16, wherein said third means includes coding means for PCM coding an input signal to provide a data signal and for selecting, based on the multiplexed send channel pulses from said second means, a channel on associated send data to provide the data signal to said second means.

19. An apparatus according to claim 18, wherein said coding means includes:
  a send channel pulse decoding unit, operatively connected to said transmitting means, deriving send synchronizing pulses by decoding the multiplexed send channel pulses;
  a PCM coder operatively connected to said send channel pulse decoding unit; and
  a sending data selecting unit, operatively connected to said send channel pulse decoding unit and said transmitting means, selectively sending a data signal on a channel of the associated send data from said PCM coder to said transmitting means based on said send synchronizing pulses.

20. An apparatus according to claim 18, wherein said second means includes transmitting means for receiving timing signals from said first means and the associated send data from said coding means and for generating the multiplexed send channel pulses for said coding means and send channel data for said first means in accordance with a phase difference between the timing signals from said first means.

21. An apparatus according to claim 20, wherein said transmitting means includes:
  a time slot phase difference correcting unit operatively connected to said first means, and
  a send channel pulse generating unit operatively connected to said time slot phase difference correcting unit and said coding means.

22. An apparatus according to claim 20, wherein said receiving means and said transmitting means respectively generate and provide received direction pulses to said decoding means and sending direction pulses to said coding means to identify the channel for a data signal on the associated receive data and associated send data.

23. An apparatus according to claim 20, wherein said receiving means generates in accordance with a first phase correction and said transmitting means generates in accordance with a second phase correction being a reciprocal phase correction in relation to the first phase correction.

* * * * *